US012566650B2

(12) United States Patent
Lo et al.

(10) Patent No.: US 12,566,650 B2
(45) Date of Patent: Mar. 3, 2026

(54) COMPUTING SYSTEM WITH EVENT PREDICTION MECHANISM AND METHOD OF OPERATION THEREOF

(71) Applicant: ULINK Technology, Inc., Santa Clara, CA (US)

(72) Inventors: Mei Yin Lo, Yilan County (TW); Weipeng Jih, Newark, CA (US); Joseph Chen, Milpitas, CA (US)

(73) Assignee: ULINK Technology, Inc., Santa Clara, CA (US)

( * ) Notice: Subject to any disclaimer, the term of this patent is extended or adjusted under 35 U.S.C. 154(b) by 84 days.

(21) Appl. No.: 18/408,942

(22) Filed: Jan. 10, 2024

(65) Prior Publication Data

US 2024/0241774 A1 Jul. 18, 2024

Related U.S. Application Data

(60) Provisional application No. 63/479,802, filed on Jan. 13, 2023.

(51) Int. Cl.
*G06F 11/00* (2006.01)
*G06F 11/07* (2006.01)
(Continued)

(52) U.S. Cl.
CPC ........ *G06F 11/008* (2013.01); *G06F 11/0727* (2013.01); *G06F 11/079* (2013.01); *G06F 11/3058* (2013.01); *G06N 20/20* (2019.01)

(58) Field of Classification Search
CPC .. G06F 9/542; G06F 11/3072; G06F 2119/00; G06F 2201/86; G06F 11/07;
(Continued)

(56) References Cited

U.S. PATENT DOCUMENTS 7,496,796 B2 2/2009 Kubo et al.
7,526,684 B2 4/2009 Bicknell et al.
(Continued)

OTHER PUBLICATIONS

How to Monitor SSD/HDD Smart Health Parameters (including SSD NVMe and SATA) over Network. Dec. 1, 2021. 10—Strike Software. https://www.10-strike.com/network-monitor/pro/hdd-smart-monitoring.shtml (Year: 2021).*
(Continued)

*Primary Examiner* — Ashish Thomas
*Assistant Examiner* — Catherine Marie Nguyen
(74) *Attorney, Agent, or Firm* — Perspectives Law Group, Corp.

(57) ABSTRACT

A computing system includes a processor configured to: generate a first artificial intelligence (AI) model for S.M.A.R.T. diagnostic information for a storage enclosure; generate a second artificial intelligence (AI) model for device temperature information for the storage enclosure; generate a third artificial intelligence (AI) model for device self-test information for the storage enclosure; generate a fourth artificial intelligence (AI) model for device-detected issues for the storage enclosure; generate a fifth artificial intelligence (AI) model for host-detected issues for the storage enclosure; generate an event prediction artificial intelligence (AI) model from the aggregation of a feature selection from the first AI model, the second AI model, the third AI model, the fourth AI model, and the fifth AI model; and operate the event prediction AI model to generate an event prediction for communicating an upcoming negative operational status for the storage enclosure.

17 Claims, 7 Drawing Sheets

(51) Int. Cl.
  *G06F 11/30* (2006.01)
  *G06N 20/20* (2019.01)
(58) Field of Classification Search
  CPC .. G06F 11/008; G06F 11/079; G06F 11/0793;
  G06F 11/0727; G05B 2219/34477; G06N
  20/20
  USPC .......................................................... 714/26
  See application file for complete search history.

(56) References Cited

U.S. PATENT DOCUMENTS

| | | | |
|---|---|---|---|
| 8,185,784 B2 | 5/2012 | McCombs et al. | |
| 8,326,669 B2 * | 12/2012 | Korupolu ......... | G06Q 10/06316 |
| | | | 705/7.22 |
| 10,547,521 B1 * | 1/2020 | Roy ........................ | H04L 43/06 |
| 2005/0216800 A1 | 9/2005 | Bicknell et al. | |
| 2007/0174720 A1 | 7/2007 | Kubo et al. | |
| 2009/0271657 A1 | 10/2009 | McCombs et al. | |
| 2015/0117174 A1 * | 4/2015 | Alber ...................... | G11B 17/00 |
| | | | 369/53.41 |
| 2016/0026552 A1 * | 1/2016 | Holden ............... | G06F 11/3006 |
| | | | 709/224 |
| 2019/0303795 A1 * | 10/2019 | Khiari ...................... | G06N 5/01 |
| 2020/0104200 A1 | 4/2020 | Kocberber et al. | |
| 2021/0378563 A1 * | 12/2021 | Derdzinski .......... | A61B 5/0004 |
| 2023/0141749 A1 * | 5/2023 | Hao .......................... | G06N 3/09 |
| | | | 714/47.3 |

OTHER PUBLICATIONS

H. Wang and H. Zhang, "AIOPS Prediction for Hard Drive Failures Based on Stacking Ensemble Model," 2020 10th Annual Computing and Communication Workshop and Conference (CCWC), Las Vegas, NV, USA, 2020, pp. 0417-0423, doi: 10.1109/CCWC47524.2020. 9031232. (Year: 2020).*

* cited by examiner

601

DEVICE-DETECTED
612  ISSUES AXIS
10

613

S.M.A.R.T.
AXIS
604

HOST-DETECTED
ISSUES AXIS

610

220

606

608

DEVICE
SELF-TEST
AXIS

DEVICE
TEMPERATURE
AXIS

| S.M.A.R.T. STATISTICS FEATURE SELECTED | ID (DEC) | NORMAL (HEX) | WORST (HEX) | THRESHOLD (HEX) | |
|---|---|---|---|---|---|
| RAW READ DATA RATE | 1 | 71 | 5A | 6 | 614 |
| SPIN-UP TIME | 3 | 63 | 63 | 0 | |
| START/STOP COUNT | 4 | 5B | 5B | 14 | |
| SEEK TIME PERFORMANCE | 8 | 6A | 6A | 0 | |
| ⋮ | ⋮ | ⋮ | ⋮ | ⋮ | |
| HARDWARE ECC RECOVERED | 195 | 0 | 1A | 5 | |

616

700

COMPUTING SYSTEM WITH EVENT PREDICTION MECHANISM AND METHOD OF OPERATION THEREOF

CROSS-REFERENCE TO RELATED APPLICATION

This application claims the benefit of U.S. Provisional Patent Application Ser. No. 63/479,802 filed Jan. 13, 2023, and the subject matter thereof is incorporated herein by reference thereto.

TECHNICAL FIELD

An embodiment of the present invention relates generally to a computing system, and more particularly to a system with event prediction mechanism.

BACKGROUND

Modern consumer and industrial electronics, especially devices such as cloud computing and/or storage, distributed computing and/or storage, networked computing and/or storage, vehicles, televisions, smart phones, and combination devices, are providing increasing levels of functionality to support modern life. Storage systems and devices of various complexity, functionality, and installed in different network or system topology are ever increasing in importance. Research and development in the existing technologies can take a myriad of different directions. As information usage increases and becomes more pervasive, existing and new systems require overall reliability.

Thus, a need still remains for a computing system with event prediction mechanism to provide improved system reliability, data reliability, or a combination thereof. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY OF THE INVENTION

An embodiment of the present invention provides a computing system including: generate a first artificial intelligence (AI) model for S.M.A.R.T. diagnostic information for a storage enclosure; generate a second artificial intelligence (AI) model for device temperature information for the storage enclosure; generate a third artificial intelligence (AI) model for device self-test information for the storage enclosure; generate a fourth artificial intelligence (AI) model for device-detected issues for the storage enclosure; generate a fifth artificial intelligence (AI) model for host-detected issues for the storage enclosure; generate an event prediction artificial intelligence (AI) model from the aggregation of a feature selection from the first AI model, the second AI model, the third AI model, the fourth AI model, and the fifth AI model; and operate the event prediction AI model to generate an event prediction for communicating an upcoming negative operational status for the storage enclosure.

An embodiment of the present invention provides a method of operation of a computing system including: generating a first artificial intelligence (AI) model for S.M.A.R.T. diagnostic information for a storage enclosure; generating a second artificial intelligence (AI) model for device temperature information for the storage enclosure; generating a third artificial intelligence (AI) model for device self-test information for the storage enclosure; generating a fourth artificial intelligence (AI) model for device-detected issues for the storage enclosure; generating a fifth artificial intelligence (AI) model for host-detected issues for the storage enclosure; generating an event prediction artificial intelligence (AI) model from the aggregation of a feature selection from the first AI model, the second AI model, the third AI model, the fourth AI model, and the fifth AI model; and operating the event prediction AI model for generating an event prediction for communicating an upcoming negative operational status for the storage enclosure.

An embodiment of the present invention provides a non-transitory computer readable medium including instructions for a computing system, the instructions including: generating a first artificial intelligence (AI) model for S.M.A.R.T. diagnostic information for a storage enclosure; generating a second artificial intelligence (AI) model for device temperature information for the storage enclosure; generating a third artificial intelligence (AI) model for device self-test information for the storage enclosure; generating a fourth artificial intelligence (AI) model for device-detected issues for the storage enclosure; generating a fifth artificial intelligence (AI) model for host-detected issues for the storage enclosure; generating an event prediction artificial intelligence (AI) model from the aggregation of a feature selection from the first AI model, the second AI model, the third AI model, the fourth AI model, and the fifth AI model; and operating the event prediction AI model for generating an event prediction for communicating an upcoming negative operational status for the storage enclosure.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
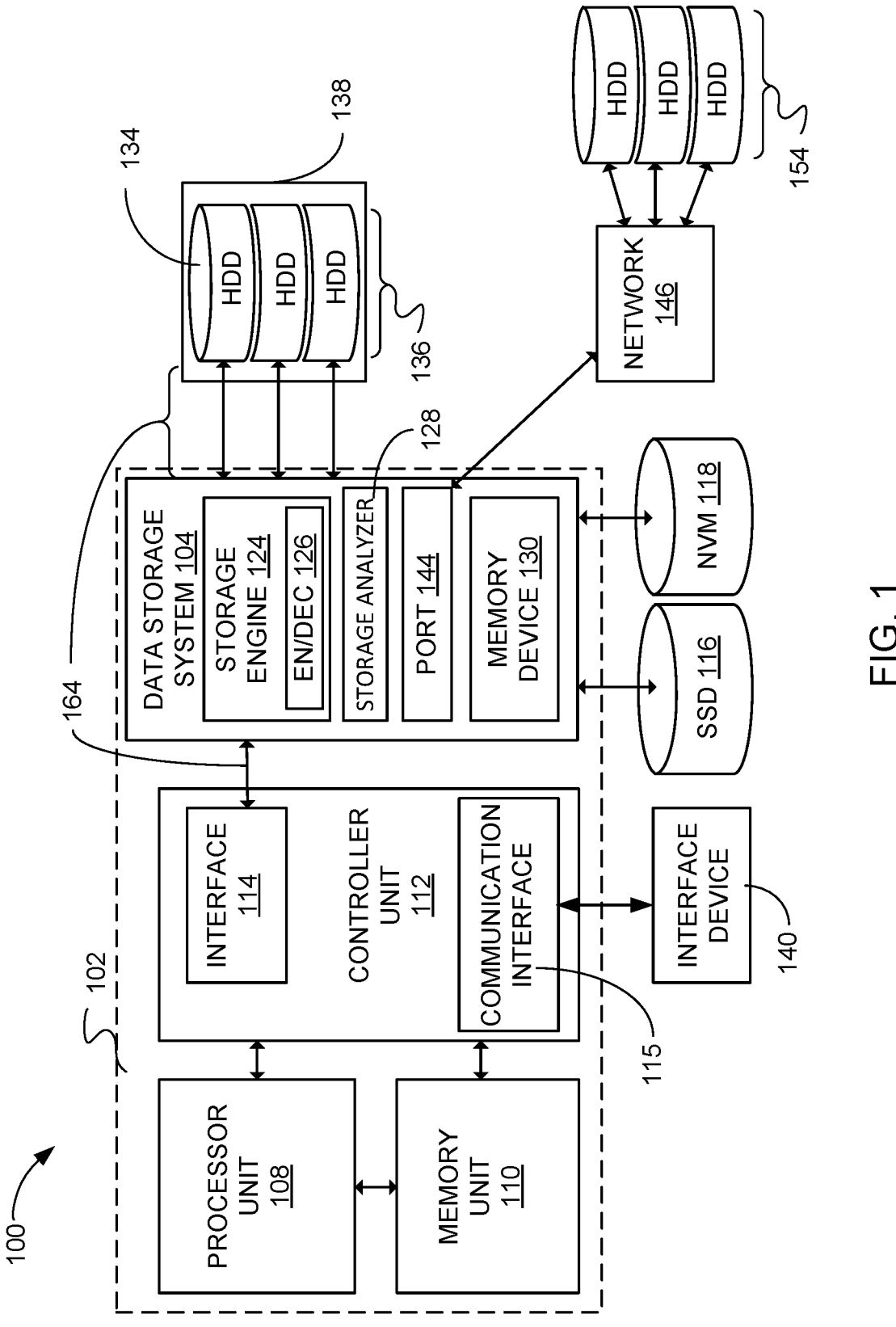
FIG. 1 is a computing system with event prediction mechanism in an embodiment of the present invention.

Embodiments provide actionable visualizations for event prediction mechanisms to avoid downtime of systems, storage, or a combination thereof and also improve data availability and reliability of the overall systems, storage, or a combination thereof. As an example of an embodiment, the event prediction mechanism can be implemented with a system of one or more artificial intelligence models, machine learning models, or light gradient boosting models (generally referred to as "models").

Further to the example of an embodiment, the architecture can provide one or more of the artificial intelligence (AI) models for each component or attribute of a system, a storage, or a combination thereof that can affect the reliability, availability, integrity, or a combination thereof. As an example of an embodiment, the attributes being monitored can represent the event for the event prediction mechanism whether or not an action is taken based on, relating to, or for the any of the attributes. Each AI model can provide information, alerts, a system administrator, or a combination thereof of that portions of the system can need attention, at risk of failing, operating in non-optimal range, or a combination thereof. The information from the AI models can trigger other parts of the system, storage, or a combination thereof to operate in a different manner to mitigate the warnings coming from these models. Continuing the example of the embodiment, the event prediction mechanism can also include one or more models that aggregate the output, information, or a combination thereof to provide an overall information, assessment, health, alert, or a combination thereof utilizing the information of the AI models for the various attributes of the system, storage, or a combination thereof.

As a specific example of an embodiment, a value for a prediction from each of the AI model for one or more of the attributes can be for the temperature of the system, storage, or a combination thereof. The output for temperature alone can be enough for the aggregation model to cause an operation to mitigate at least the temperature warning or act based on it, send an alert, remove the system or the storage or both, or a combination thereof to avoid downtime, loss of data or system availability, reduction of data or system reliability, or a combination thereof.

Continuing with the specific example of an embodiment, a value for a prediction from another of the AI model for one or more of the attributes can be related to the self-test of the system or storage or both, host-related or processor-related issues, device-detected issues, issues based on Self-Monitoring, Analysis, and Reporting Technology (S.M.A.R.T.), or a combination thereof of the system, storage, or a combination thereof. Similarly, as for temperature, each of the attributes alone can be enough for the aggregation model to cause an operation to mitigate at least the temperature warning or act based on it, send an alert, remove the system or the storage or both, or a combination thereof to avoid downtime, loss of data or system availability, reduction of data or system reliability, or a combination thereof. Further, the aggregation model can determine or output an overall prediction to cause an operation to mitigate at least the attribute of concern-based warning or act based on it, send an alert, remove the system or the storage or both, or a combination thereof to avoid downtime, loss of data availability, system availability, reduction of data reliability, system reliability, or a combination thereof.

Further for example of an embodiment, the actions based on the outputs from the individual AI models, the aggregation model, or a combination thereof can be to take actions of the entire or overall system, storage, or a combination thereof and not just for a subset of the attributes that are of concern. One such action, as an example, is to remove a storage device, the storage system, or a combination. There are many possible actions for the removal including physical removal, physical replacement, failover to another storage device or storage system or both, or a combination thereof.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or combination thereof in an embodiment of the present invention in accordance with the context in which the term is used. For example, the software can be machine code, firmware, embedded code, and application software. Also for example, the hardware can be circuitry, transistors, processor, computer, integrated circuit, integrated circuit a sensor, a microelectromechanical system (MEMS), passive devices, a convolutional neural network, or combination thereof. Further, if a module is written in the apparatus claims section below, the modules are deemed to include hardware circuitry for the purposes and the scope of apparatus claims. The term "unit" referred to herein can include hardware only implementations, where performance requirements preclude the use of software.

Referring now to FIG. 1, therein is shown a computing system 100 with event prediction mechanism in an embodiment of the present invention. The computing system 100 with event prediction mechanism can provide recommendations, cause actions related to one or more attributes that can affect data availability, data reliability, or a combination thereof. Attributes are aspects of the computing system 100, one or more portions of the computing system 100, or a combination thereof. Examples of the attributes can include Self-Monitoring Analysis and Reporting Technology (S.M.A.R.T.) diagnostic information, device temperature, device self-test, device-detected issues, and host-detected issues.

In the example shown in FIG. 1, the computing system 100 can be represented as a functional block diagram with the computing system 100 including a host computer 102 with a data storage system 104. The functional block diagram can include the data storage system 104 depicted as part of the host computer 102 such as a desk top computer, laptop computer, server, workstation, or computer cluster. It is understood that the data storage system 104 can be implemented as an independent unit coupled to the host computer 102.

The host computer 102 can include at least the data storage system 104, a processor 108 such as a host central processing unit with one or more processors, a memory unit 110 such as a host memory coupled to the processor 108, and a controller 112 such as host bus controller. The controller 112 can provide an interface 114 such as an interface bus 164, which can allow the host computer 102 to access or utilize the data storage system 104. The interface 114 can be implemented as hardware including electronic circuitry, transistors, integrated circuits, an integrated circuit core, a processor, electronic passive devices, or combination thereof. The interface 114 can also be implemented with the hardware operating software, machine code, firmware, embedded code, application software, or combination thereof.

In some embodiments, functions of the controller 112 can be provided by the processor 108. The processor 108 can be implemented with hardware circuitry in a number of different combinations or structures. For example, the processor 108 can be a processor, an application specific integrated circuit (ASIC) an embedded processor, a microprocessor, a hardware control logic, a hardware finite state machine (FSM), a digital signal processor (DSP), or combination thereof.

The data storage system 104 can include or can be coupled to a solid state disk 116, such as a non-volatile memory based storage device including a peripheral interface system, a non-volatile memory 118, such as an internal memory card for expanded or extended non-volatile system memory, or a combination thereof. The data storage system 104 can also include or can be coupled to a hard disk drive (HDD) 134 that can be mounted in the host computer 102, external to the host computer 102, or combination thereof. The data storage system 104 can further include or can be coupled to a hard disk drive (HDD) 134 that is a hybrid including rotating media as well as solid state media, as an example, that can be mounted in the host computer 102, external to the host computer 102, or combination thereof. For example, the solid state disk 116, the non-volatile memory 118, and the hard disk drive 134 can be considered as direct attached storage (DAS) devices. An array of storage devices 136 can be formed of a plurality of the hard disk drive 134 in a storage enclosure 138. It is understood that the array of storage devices 136 can include a plurality of the solid state disk 116, the hard disk drive 134, or a combination thereof operating within the storage enclosure 138.

The data storage system 104 can also include a network attach port 144 for coupling a network 146. For example, the network 146 can be a local area network (LAN), a storage area network (SAN), cloud storage, or combination thereof. The network attach port 144 can provide access to network attached storage (NAS) array 154. It is understood that the network attached storage (NAS) array 154 can include a plurality of the solid state disk 116, the hard disk drive 134, or a combination thereof. It is further understood that the network 146 can include Internet access and support a storage cloud structure.

For illustrative purposes, the network attached storage array 154 are shown as a plurality of the hard disk drive 134, although it is understood that the network attached storage array 154 can include magnetic tape storage (not shown), storage devices similar to the solid state disk 116, storage devices similar to the non-volatile memory 118, storage devices similar to the hard disk drive 134, or combination thereof, that can be accessed through the network attach port 144, the network 146, or combination thereof. The network attached storage array 154 can also include just a bunch of disks (JBOD) systems in the storage enclosure 138, or redundant array of intelligent disks (RAID) systems in the storage enclosure 138, other network attached storage array 154, or combination thereof.

The data storage system 104 can be coupled to the interface 114, for providing access to multiple of the direct attached storage (DAS) devices, with the interface bus 164 for a storage interface, such as Serial Advanced Technology Attachment (SATA), the Serial Attached SCSI (SAS), or the Peripheral Component Interconnect-Express (PCI-e) attached storage devices. The interface bus 164 can couple one or more of the data storage system 104. It is understood that the data storage system 104 can be installed in a server farm that can support many of the data storage system 104 for processing large data structures. The critical nature of the data reliability can be a key aspect of the data storage system 104.

The data storage system 104 can include a storage engine 124, with an encode/decode unit 126, a storage analyzer 128, and a memory device 130. The storage engine 124 can be implemented with hardware circuitry, software, or combination thereof in a number of ways, combinations, or structures. For example, the storage engine 124 can be implemented as a processor, an application specific integrated circuit (ASIC) an embedded processor, a microprocessor, a hardware control logic, a hardware finite state machine (FSM), a digital signal processor (DSP), or combination thereof.

The storage engine 124 can control the flow and management of data to and from the host computer 102, from and to the direct attached storage (DAS) devices, from and to the network attached storage array 154, or combination thereof. The storage engine 124 can also perform data reliability checks and corrections. The encode/decode unit 126 can be controlled by the storage engine 124. The encode/decode unit 126 can be a hardware device configured to implement an erasure or error correction code of the storage data or communicated data, such as a forward error correction code. The encode/decode unit 126 can encode any storage data written to the solid state disk 116, the non-volatile memory 118, the array of storage devices 136, the network attached storage array 154, or the combination thereof. The encode/decode unit 126 can decode and recover any of the storage data, that uses the erasure or error correction code, read from the solid state disk 116, the non-volatile memory 118, the array of storage devices 136, the network attached storage array 154, or the combination thereof.

The storage analyzer 128 can be a hardware structure executing specialized software that is configured to monitor the solid state disk 116, the array of storage devices 136, the network attached storage array 154, or the combination thereof. The storage analyzer 128 can collect performance and status information from the solid state disk 116, each of the hard disk drive 134 in the array of storage devices 136, each of the hard disk drive 134 in the network attached storage array 154, or the combination thereof in order to predict the stability and a remaining useful life (RUL) 221 of the attached devices.

The storage engine 124 can control and manage flow of data between the direct attached storage (DAS) devices, the array of storage devices 136, the network attached storage array 154, amongst any of the devices, or combination thereof. The storage engine 124 can process all of the used data through the encode/decode unit 126 for segmenting the user data and generating check data for correcting any erasure or other types of corruption that might occur.

For illustrative purposes, the storage engine 124 is shown as part of the data storage system 104, although the storage engine 124 can be implemented or partitioned differently. For example, the storage engine 124 can be implemented within the host computer 102, implemented partially with software and partially implemented in hardware, or a combination thereof. The storage engine 124 can also be external to the data storage system 104.

For example, the storage engine 124 can be part of the direct attached storage (DAS) devices described above, the network attached storage array 154, or combination thereof. The functions or functionalities of the storage engine 124 can also be distributed as part of the host computer 102, the direct attached storage (DAS) devices, the network attached storage array 154, or combination thereof.

The storage analyzer 128 can collect performance and status information including S.M.A.R.T. diagnostic information, device temperature, device self-test, device-detected issues, and host-detected issues in order to calculate the remaining useable life (RUL) 221 of the solid state disk 116, each of the hard disk drive 134 in the array of storage devices 136, each of the hard disk drive 134 in the network attached storage array 154, or the combination thereof.

By way of an example. The S.M.A.R.T. diagnostic information can detect degradation in seek performance, data read reliability, data write reliability, the number of unusable data blocks, command execution times, or the like. The storage analyzer 128 can detect changes in the S.M.A.R.T. diagnostic information as an indicator of the current status of the solid state disk 116, each of the hard disk drive 134 in the array of storage devices 136, each of the hard disk drive 134 in the network attached storage array 154, or the combination thereof. The storage analyzer 128 can also monitor device temperature, device self-test data, device-detected issues, and host-detected issues in order to calculate the remaining useable life (RUL) 221 for each of the devices being monitored.

Continuing with the example, the device-detected issues and the host-detected issues can include communication errors across the interface bus 164, command time-out issues, data parity issues, write retry count, read retry count, and the like. The self-test data can be retrieved by a special interface command or after a power-on-reset of the attached devices. The self-test data can include capacity changes, changes in current consumption, utilization of spare locations, hardware performance verification, and the like for each of the attached devices. The device temperature can be reported by the attached devices to indicate the operating temperature during utilization of the attached devices.

The memory device 130 can function as a local cache to the data storage system 104, the computing system 100, or combination thereof. The memory device 130 can include a volatile memory, a nonvolatile memory, or combination thereof. For example, the volatile memory can include static random access memory (SRAM), dynamic random access memory (DRAM), or combination thereof. The memory device 130 can be used by the storage analyzer 128 and the encode/decode unit 126 during the encoding of the storage data, decoding of the storage data, and during recovery of the storage data.

For illustrative purposes, the data storage system 104 is shown internal to the host computer 102, although it is understood that the data storage system 104 can be implemented and partitioned differently. For example, the data storage system 104 can be implemented as coupled to the host computer 102, as part of a chip or chipset in the host computer 102, as partially implemented in software and partially implemented in hardware in the host computer 102, or combination thereof. The data storage system 104 can be coupled to the host computer 102 through the network 146. For example, the data storage system 104 can be part of the direct attached storage (DAS) devices described above, the network attached storage array 154, or combination thereof. The data storage system 104 can be distributed as part of the host computer 102, the direct attached storage (DAS) devices, the network attached storage array 154, or combination thereof.

Also for illustrative purposes, the encode/decode unit 126 is shown as being included in the storage engine 124 and being associated with data storage or data access processes. However, it is understood that the encoder/decoder unit can be applicable to information communication, such as between devices, or any other processes to aid accurate recovery of intended information.

As an example, the event prediction mechanism, including the storage analyzer 128, can be implemented in software, firmware, hardware, or a combination thereof. The event prediction mechanism can be implemented distributed or non-distributed across portions of the computing system 100. It is understood that the event prediction mechanism utilizes information measured and collected by the solid state disk 116, each of the hard disk drive 134 in the array of storage devices 136, each of the hard disk drive 134 in the network attached storage array 154, or the combination thereof. The processor 108 can manage the storage analyzer 128 to present the remaining usable life (RUL) 221 for each of the attached devices through a communication interface 115. The communication interface 115 can be a hardware structure configured to interact with a user (not shown). The communication interface 115 can be coupled to an interface device 140 including an input device and a display device configured to interact with the user.

The event prediction mechanism can provide a graphic display through the interface device 140 to allow the user to select one of the solid state disk 116, the hard disk drive 134 in the array of storage devices 136, or the hard disk drive 134 in the network attached storage array 154 to display the remaining usable life of the selected device.

It is understood that the storage analyzer 128 can maintain the statistics for each of the solid state disk 116, the hard disk drive 134 in the array of storage devices 136, or the hard disk drive 134 in the network attached storage array 154 during their operation. The event prediction mechanism can periodically, or by command, generate a symptom event prediction AI chart (not shown) for display on the interface device 140.

It has been discovered that the event prediction mechanism can predict the remaining usable life of the solid state disk 116, the hard disk drive 134 in the array of storage devices 136 in the storage enclosure 138, the hard disk drive 134 in the network attached storage array 154, or a combination thereof up to one year at a time. The event prediction mechanism can display the event prediction AI chart for each of the attached devices that the user chooses to monitor. The storage analyzer 128, of the event prediction mechanism, can utilize machine learning, while monitoring the S.M.A.R.T. diagnostic information, the device temperature, the device self-test, the device-detected issues, and the host-detected issues to calculate the event prediction AI chart for devices selected by the user.

Figure 2:
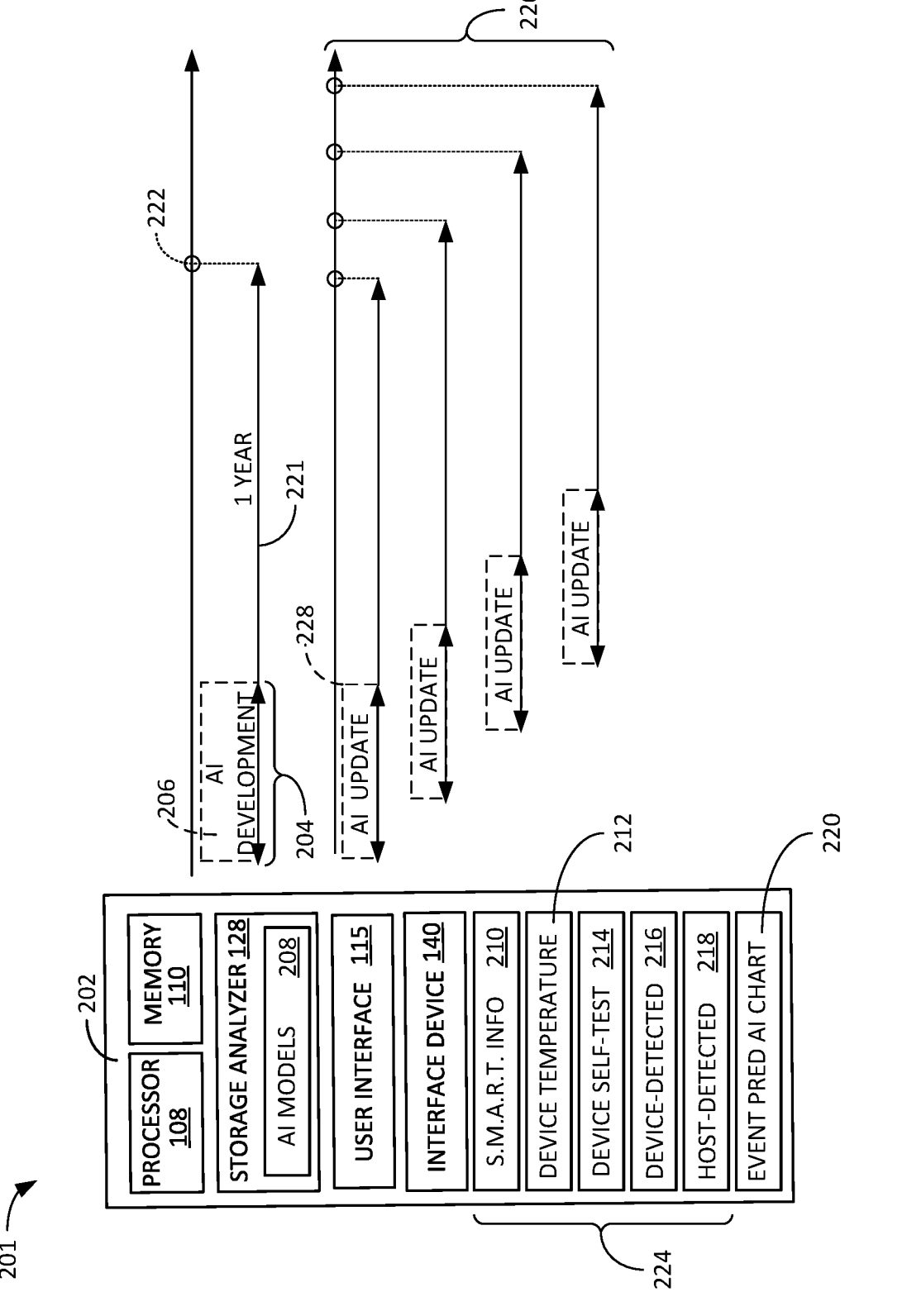
FIG. 2 is an example of training of the event prediction mechanism and monitoring of the performance of the event prediction mechanism in an embodiment.

Referring now to FIG. 2, therein is shown is an example of training of the event prediction mechanism 202 and monitoring of the performance of the event prediction mechanism 202 in an embodiment. As an example, an embodiment of the event prediction mechanism 202 can be operated within the computing system 100. The embodiment of the event prediction mechanism 202 can include the processor 108, the memory 119, the storage analyzer 128, including artificial intelligence (AI) models 208, the communication interface 115, and the interface device 140. The storage analyzer 128 can utilize machine learning to train an internal hardware to implement the artificial intelligence (AI) models 208, used to recognize degradation of the performance of the selected one of the hard disk drive 134 of FIG. 1. The AI models 208 can be implemented as a light gradient boosting machine (LGBM) model 208. The storage analyzer 128 can be trained to monitor a S.M.A.R.T. diagnostic information 210, a device temperature information 212, a device self-test information 214, device-detected issues 216, and host-detected issues 218 in order to calculate an event prediction AI chart 220 for devices selected by the user. The event prediction AI chart 220 can be displayed on the interface device 140 of FIG. 1 whenever the user would like to see it.

The event prediction mechanism 202 can be trained and verified in a training stage 204. The training stage 204 of the event prediction mechanism 202 can include downloading a performance specification for the selected one of the hard disk drive 134. As an example, the training stage 204 can collect operational specifications of 1,500,000+ of the hard disk drive 134. Each of the hard disk drive 134 configured to operate in the event prediction mechanism 202 can provide manufacturing performance data stored in the media during the manufacturing self-test.

By way of an example, the training stage 204 can access the physical specifications of the hard disk drive 134 and manufacturing data for specific ones of the hard disk drive 134 being tested. The event prediction mechanism 202 can initiate an Artificial Intelligence (AI) development 206 in order to produce the AI models 208 for each of the attributes, such as, the S.M.A.R.T. diagnostic information 210, the device temperature information 212, the device self-test information 214, the device-detected issues 216, and the host-detected issues 218. By way of an example, the hard disk drive 134 that is under test can operate completely within the physical specification, but the AI models 208 can identify trends or changes that don't yet impact the performance of the hard disk drive 134. The goal of the AI models 208 is to identify the remaining usable life (RUL) 221 that is, by way of an example, one year from the completion of analysis by the event prediction mechanism 202.

In this example, a functional indicator 222 can be used to provide a positive operational status or a negative operational status, as an output. As a specific example, the functional indicator 222 can represent a survival or non-survival of the computing system 100, a portion of the computing system 100, the data storage system 104 of FIG. 1 or a portion thereof, the SSD 115 of FIG. 1, the network card 146 of FIG. 1, the hard disk drive 134, the storage enclosure 138, or a combination thereof. FIG. 2 also depicts, as an example, of when the event prediction mechanism 202 would output or predict the functional indicator 222 would to be, in this example shown as 1 year.

For illustrative purposes, the functional indicator 222 is described as representing one condition or an opposite condition, although it is understood that the functional indicator 222 can be represented or output differently by the event prediction mechanism 202 or a portion thereof. For example, the functional indicator 222 can represent multiple conditions, such as for each of the attributes 224 defined by the S.M.A.R.T. diagnostic information 210, the device temperature information 212, the device self-test information 214, the device-detected issues 216, and the host-detected issues 218. Also, for example, the functional indicator 222 can represent one or more conditions and probabilities values adding up to "1" or not related to each other (not needing to add to "1").

The event prediction mechanism 202 can initiate multiple time lines of monitoring 226 of the attached devices staggered over time. As an example, each of the monitoring 226 can depict an AI update 228, performed by the processor 108 of FIG. 1, used to refine the AI models 208 or even training from scratch of the event prediction mechanism 202 in the case of a new device added to the computing system 100. Similarly, the functional indicator 222 can be displayed for each of the staggered time line is shown to predict the functional indicator 222 over time, in each staggered time-line. It is understood that the multiple time lines of monitoring 226 can represent refinements to the existing AI models 208 already used by the computing system 100 or the generation of a new set of the AI models 208 when new devices are added to the computing system 199.

For illustrative purposes, the event prediction mechanism 202 is shown with the multiple time lines of monitoring 226 depicting the functional indicator 222 and a time span of 1 year, although it is understood that the event prediction mechanism 202 can depict the multiple time lines of monitoring 226 differently. As an example, difference in the multiple time lines of monitoring 226 can depict one or more differences in the training sets for one or more portions of the AI models 208 in the event prediction mechanism 202, differences between the individual AI models 208 for each attributes 224 and the event prediction AI chart 220, and the functional indicators 222 can relate to the AI models 208 refinement. Further for example, the multiple time lines of monitoring 226 can also represent a re-training or a new training for an new or different attached device based on one or more changes to the computing system 100, such as the changes from a replacement or removal of a portion of the computing system 100, a failover to a different system or components or different life cycle, or a combination thereof.

The functions of embodiments described in this application can be implemented as instructions stored on a non-transitory computer readable medium to be executed by the host computer 102 of FIG. 1, the data storage system 104 of FIG. 1, the storage engine 124 of FIG. 1, or combination thereof. The non-transitory computer medium can include the host memory 110 of FIG. 1, the hard disk drive 134, an optical disk device, a smart card, a non-volatile memory device, the network attached storage array 154 of FIG. 1, the non-volatile memory 118 of FIG. 1, the memory devices 130 of FIG. 1, the solid state disk 116 of FIG. 1, the hard disk drive 134, or combination thereof. The non-transitory computer readable medium can include compact disk (CD), digital video disk (DVD), or universal serial bus (USB) flash memory devices. The non-transitory computer readable medium can be integrated as a part of the computing system 100 or installed as a removable portion of the computing system 100.

It has been discovered that the AI development 206 can learn, by way of an example, the physical specification and normal operating patterns of the hard disk drive 134 and can track changes over time to detect possible weaknesses in the device that can cause failures in the future. The machine learning of the storage analyzer 128 can be refined over time to become aware of trends and potential failures before any issues are detected in the S.M.A.R.T. diagnostic information 210, the device temperature information 212, the device self-test information 214, the device-detected issues 216, or the host-detected issues 218 individually.

Figure 3:
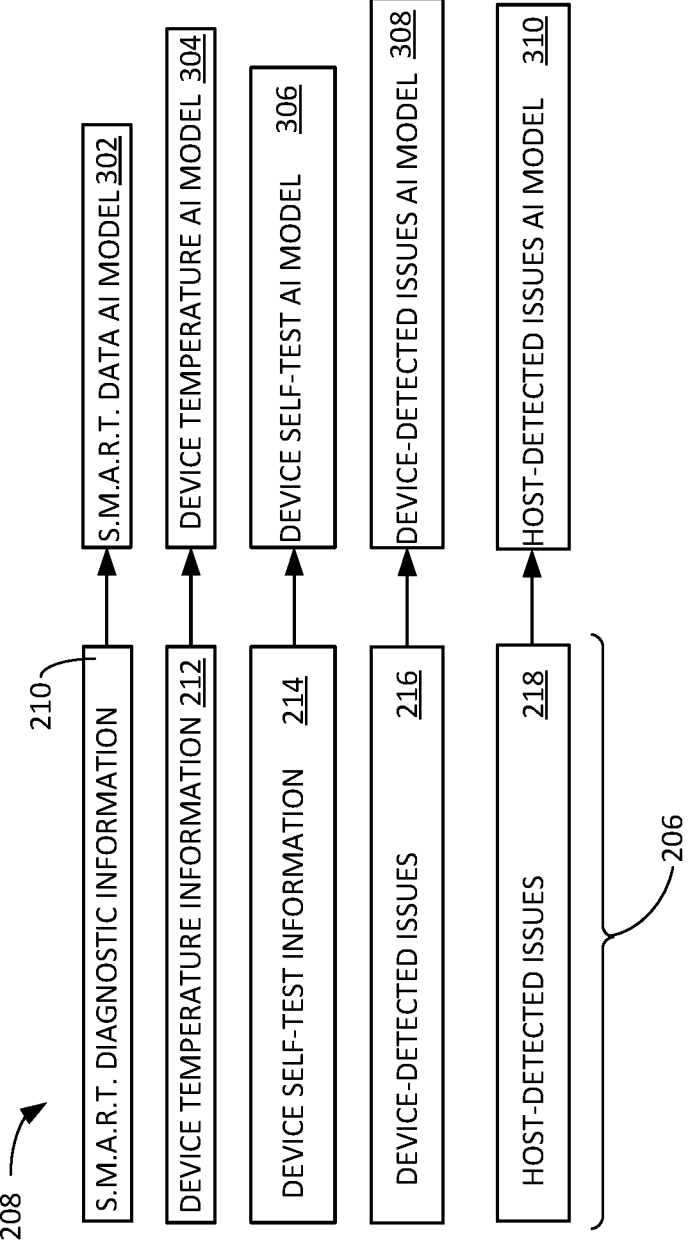
FIG. 3 is a representation of examples of an embodiment of the AI models of the event prediction mechanism of FIG. 2.

Referring now to FIG. 3, therein is shown a representation of examples of an embodiment of the AI models 208 of the event prediction mechanism 202 of FIG. 2. The examples of the embodiment of the AI models 208 of the event prediction mechanism 202 depicts the information and features needed to train each of the AI models 208 for each of the examples of the attributes 224 of FIG. 2 described earlier.

By way of an example, the S.M.A.R.T. diagnostic information 210 can be processed by the AI development 206 and the template for a first artificial intelligence model 302, such as a S.M.A.R.T. data AI model 302 represents the detail or the information for this particular model and attribute 224. The AI development 206 can receive the S.M.A.R.T. diagnostic information 210 for processing by a convolutional neural network (CNN) not shown. A broad spectrum is represented in the S.M.A.R.T. diagnostic information 210. By way of an example, the S.M.A.R.T. diagnostic information 210 can include capacity numbers, seek performance measurements, spare capacity utilization, error correction statistics, motor current utilization, and other significant performance data. The resulting version of the S.M.A.R.T. data AI model 302 can select the most susceptible statistics for monitoring the remaining usable life of the hard disk drive 134 of FIG. 1 being monitored. It is understood that the S.M.A.R.T. data AI model 302 can be developed for any of the attached storage devices.

The device temperature information 212 can be processed by the AI development 206 by monitoring the device temperature information 212 as compared to the physical specification of the hard disk drive 134. The generation of a second artificial intelligence model 304, such as a device temperature AI model 304 can monitor any trend in the device temperature information 212 during the training and monitoring by the event prediction mechanism 202.

Continuing the example, the device self-test information 214 can maintain data collected during the manufacture of the hard disk drive 134 as well as the data collected during power-on-reset. The resulting performance characteristics of the hard disk drive 134 can act like a finger print for the hard disk drive 134 defining its baseline performance. The AI development 206 can process device self-test information 214 to generate a third artificial intelligence model 306, such as a device self-test AI model 306. The device self-test AI model 306 can monitor for any changes in the characteristics of the hard disk drive 134. The device self-test AI model 306 can select which of the characteristics of the data from the device self-test information 214 should be monitored.

As the example continues, the device-detected issues 216 can include any error or exception that can only be detected by the hard disk drive 134. The types of errors that might be detected by the hard disk drive 134 can include position errors, data errors (correctable), component issues, excess shock, or the like. The AI development 206 can process the device-detected issues 216 to produce a fourth artificial intelligence model 308, such as a device-detected issues AI 308. It is understood that the example addressed only the hard disk drive 134, but the device-detected issues AI 308 can be developed for any of the storage devices that might be developed for use by the computing system 100.

The host-detected issues 218 can be processed by the AI development 206 to produce a fifth artificial intelligence model 310, such as a host-detected issues AI model 310 configured to monitor issues that can only be detected by the host system 102 of FIG. 1. The host-detected issues AI model 310 can monitor command time-out, data errors, protocol errors, and the like.

For illustrative purposes, each of the AI models 208 for the different attributes 224 are shown with different number of the "Feature Set" for this particular attribute 224, although it is understood that the attribute 224 can differ from what is described. For example, different number or even different ones of the attributes 224 can be used for the aggregation model and from the different number of the AI models 208 or for different models for the differing attributes 224. Further, the information sampled in some of the templates can change for one or across multiple of the AI models 208 depending on the specifications of the portion of the computing system 100 being assessed by the AI models 208.

Figure 4:
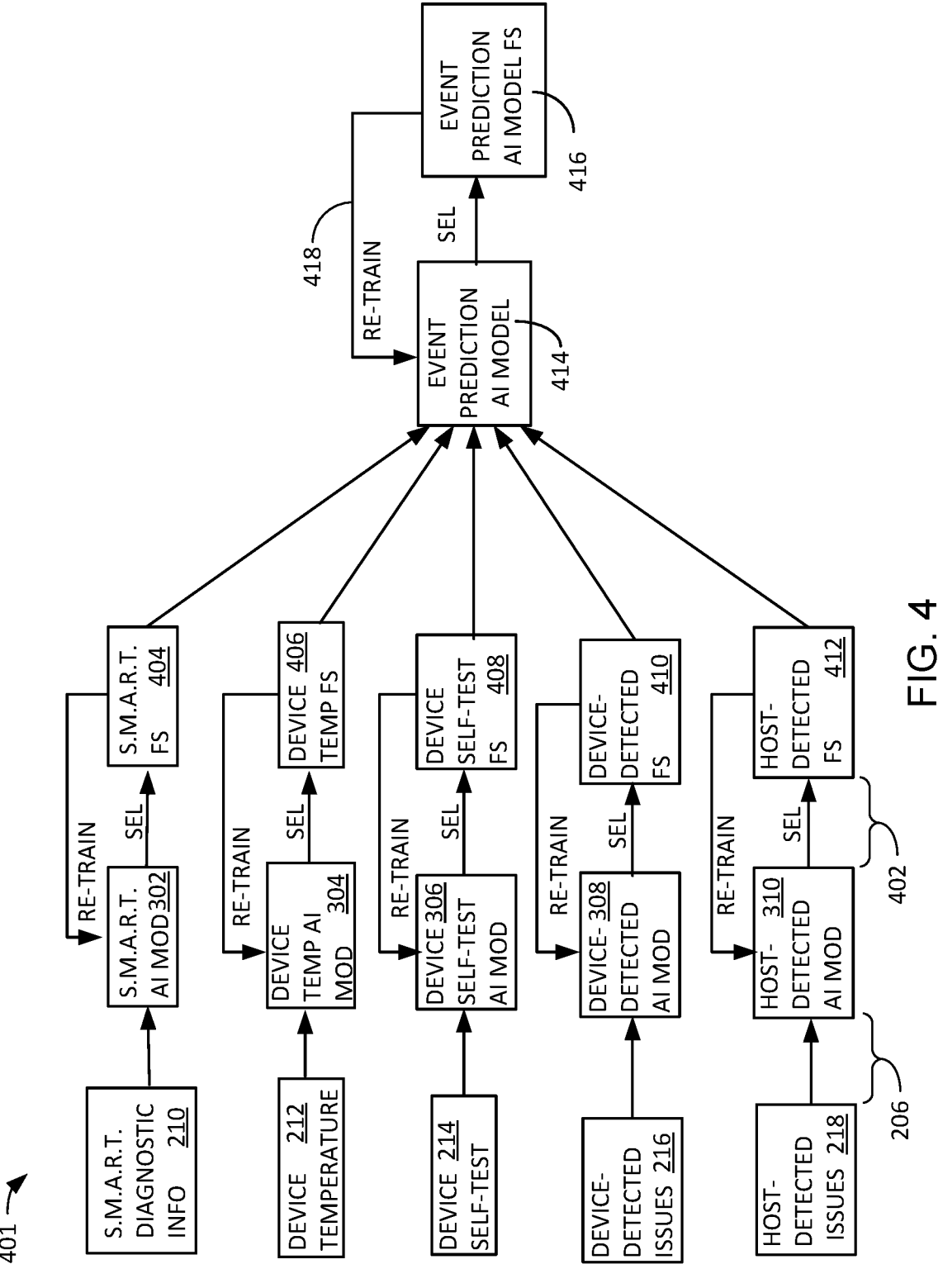
FIG. 4 is an example of a flow of training of the AI models of FIG. 2, the event prediction mechanism, and a combination thereof in an embodiment.

Referring now to FIG. 4, therein is shown an example of a flow of training 401 of the AI models 208 of FIG. 2 the event prediction mechanism 202, and a combination thereof in an embodiment. The example of the flow of the training 401 of the AI models 208, including processing the S.M.A.R.T. diagnostic information 210, the device temperature information 212, the device self-test information 214, the device-detected issues 216, or the host-detected issues 218 by the AI development 206.

The resulting AI models 208 can include the S.M.A.R.T. data AI model 302, device temperature AI model 304, device self-test AI model 306, the device-detected issues AI model 308, and the host-detected issues AI model 310. Each of the AI models 208 performs a feature selection process 402 to generate a S.M.A.R.T. feature selection 404, a device temperature feature selection 406, a device self-test feature selection 408, a device-detected issues feature selection 410, and a host-detected feature selection 412. It is understood that the feature selection process 402 can provide a subset of the total features represented in the AI models 208 for submission to a event prediction AI model 414.

The S.M.A.R.T. feature selection 404 can be used to re-train 418 the S.M.A.R.T. data AI model 302 and provide an updated set of the selected features. The device temperature feature selection 406 can be used to re-train 418 the device temperature AI model 304 and provide an updated set of the selected features. The device self-test feature selection 408 can be used to re-train 418 the device self-test AI model 306 and provide an updated set of the selected features. The device-detected issues feature selection 410) can be used to re-train 418 the device-detected issues AI model 308 and provide an updated set of the selected features. The host-detected feature selection 412 can be used to re-train 418 the host-detected issues AI model 310 and provide an updated set of the selected features.

Each of the selected feature sets can be merged to form an event prediction AI model 414 that is configured to a reduced feature set as an event prediction AI model feature set 416 that can be utilized to produce the event prediction AI chart 220 for display on the interface device 140 of FIG. 1. The event prediction AI model feature set 416 can be used to re-train 418 the event prediction AI model 414 and provide an updated set of the selected features.

As an example, the re-training 418 can range from one, some, or all of the AI models 208 at different times or concurrently. Similarly, the re-training 418 of the event prediction AI model 414 can be at different times to the AI model 208 or concurrently or sequentially or in parallel or a combination thereof.

Figure 5:
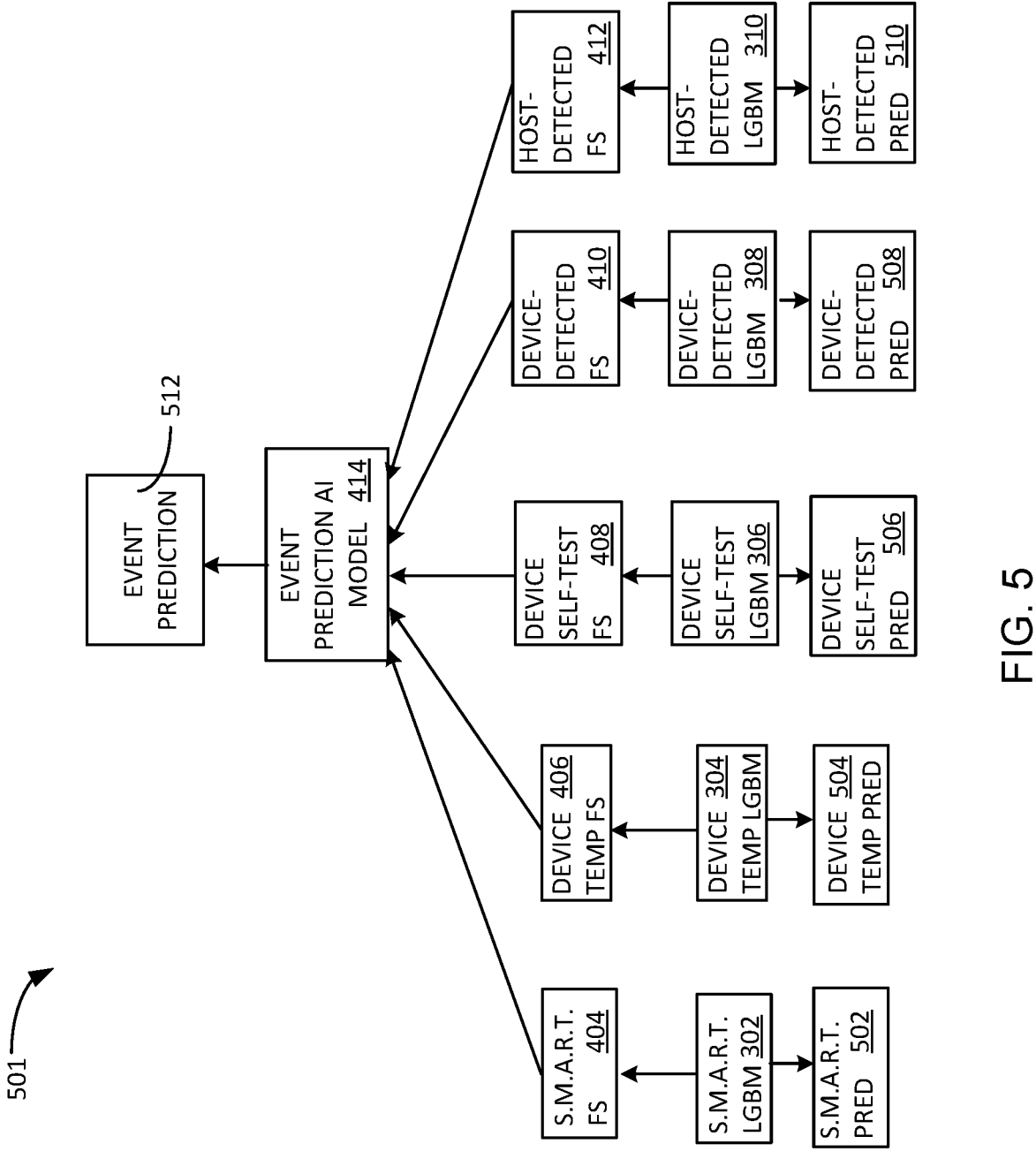
FIG. 5 is an example a flow of operation of the event prediction mechanism and the AI models in an embodiment.

Referring now to FIG. 5, therein is shown an example a flow of operation of the event prediction mechanism 202 of FIG. 2 and the AI models 208 of FIG. 2 in an embodiment. The flow of operation of the event prediction mechanism 202 depicts an example where the event prediction mechanism 202 generates multiple predictions or the functional indicator 222. As an example, the S.M.A.R.T. data AI model 302 can calculate a S.M.A.R.T. prediction 502 based on the S.M.A.R.T. feature selection 404, the device temperature AI model 304 can calculate a device temperature prediction 504 based on the device temperature feature selection 406, the device self-test AI model 306 can calculate a device self-test prediction 506 based on the device self-test feature selection 408, the device-detected issues AI model 308 can calculate a device-detected issues prediction 508 based on the device-detected issues feature selection 410, and the host-detected issues AI model 310 can calculate a host-detected issues prediction 510 based on the host-detected feature selection 412. It is understood that each of the AI models 208 can provide a different perspective of the remaining usable life of the storage device being analyzed and thus can provide very different results.

The event prediction AI model 414 can receive the S.M.A.R.T. feature selection 404, the device temperature feature selection 406, the device self-test feature selection 408, the device-detected issues feature selection 410, and the host-detected feature selection 412 in order to combine an event prediction mechanism prediction 512. The event prediction AI model 414 can adjust the weight of each of the inputs based on the current trends in the storage device being analyzed, for example the hard disk drive 134. It is understood that any of the storage devices configured to operate in the computing system 100 can be analyzed by the event prediction mechanism 202.

It is understood that the event prediction mechanism prediction 512 can differ from the S.M.A.R.T. prediction 502, the device temperature prediction 504, the device self-test prediction 506, the device-detected issues prediction 508, and the host-detected issues prediction 510. Since the event prediction AI model 414 can view all of the feature selections from the AI models 208, a more comprehensive compilation of the operating status of the storage device is provided. By way of an example, the event prediction AI model 414 can detect an excessive shock event in the device-detected issues feature selection 410 and excessive seek times in the S.M.A.R.T. feature selection 404, which independently are not detected as an issue, but in combination can indicate a damaged bearing in the unit that can degrade into tracking errors and data reliability issues over time. The event prediction AI model 414 can monitor the situation to re-train 418 the AI models 208 in order to provide additional information, through a different feature selection, for analysis.

Figure 6:
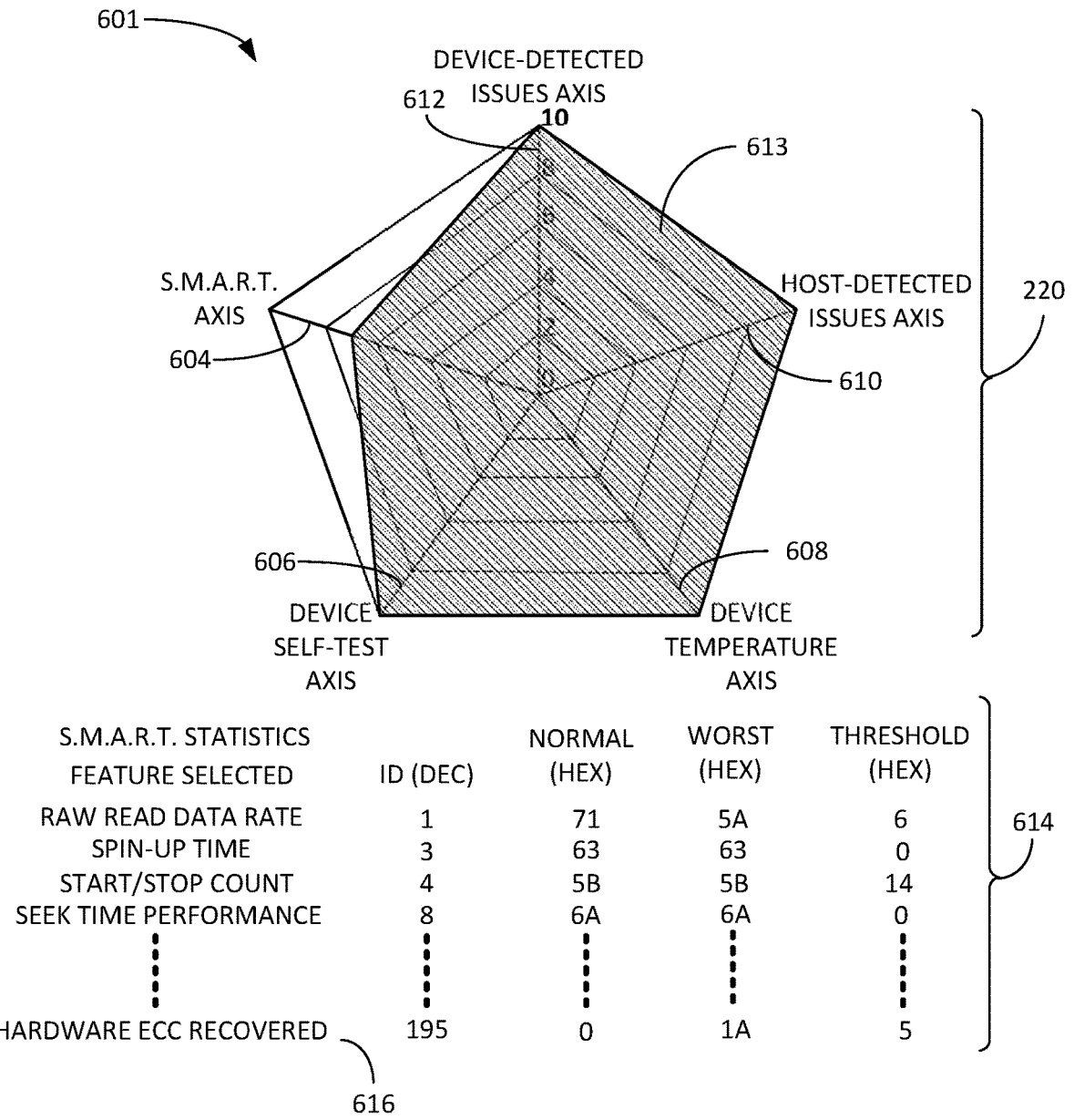
FIG. 6 is an example of outputs of the event prediction mechanism and the AI models in an embodiment.

Referring now to FIG. 6, therein is shown an example of outputs 601 of the event prediction mechanism 202 and the AI models 208 in an embodiment. The outputs 601 of the event prediction mechanism 202 depict an example of information relating to a selected one of the hard disk drive 134 of FIG. 1 of the computing system 100, a portion of the computing system 100, or a combination thereof being assessed. The event prediction AI chart 220 can include a S.M.A.R.T. axis 604, a device self-test axis 606, a device temperature axis 608, a host-detected issues axis 610, and a device-detected issues axis 612. The event prediction AI chart 220) can have a range from 0 to 10 for each of the S.M.A.R.T. axis 604, the device self-test axis 606, the device temperature axis 608, the host-detected issues axis 610, and the device-detected issues axis 612. The value of 10 indicates a 100% probability that the selected one of the hard disk drive 134 will remain functional in the computing system 100 for one year or more. A value of 0 indicated that there is 0% chance that the selected one of the hard disk drive 134 will remain functional in the computing system 100 for one year and is likely to suffer imminent failure.

Each of the features being monitored is assigned the remaining usable life (RUL) 221 of FIG. 2 value of 200 initially. Each of the features can display a different degradation rate based on the type of issues detected. The AI models 208 can establish the degradation rate for the feature being monitored during the training stage 204 of FIG. 2. By way of an example, the S.M.A.R.T. data AI model 302 can differentiate the degradation rate of soft seek errors from uncorrectable data errors. The S.M.A.R.T. data AI model 302 can be trained with manufacturing data and the physical specification of the hard disk drive 134. During verification, the S.M.A.R.T. data AI model 302 can be calibrated to represent the RUL 221 value greater than or equal to 150 as a score of 10 on the S.M.A.R.T. axis 604. The RUL 221 having a value between 101 and 149 can represent a score of seven on the S.M.A.R.T. axis 604. The RUL 221 having a value between one and 100 can represent a score of three on the S.M.A.R.T. axis 604 indicating a 30% annual survival rate.

Each of the AI models 208 can be calibrated for a similar indication of the RUL 221 based on its input and the learned degradation rate displayed during the training stage 204. Each of the device temperature AI model 304, the device self-test AI model 306, the device-detected issues AI model 308, and the host-detected issues AI model 310 can be calibrated to the same scale of the RUL 221 as the S.M.A.R.T. data AI model 302 and in the same manner.

By way of an example, a grading overlay 613 of the event prediction AI chart 220) indicates the current status of the selected one of the hard disk drive 134 indicating that the S.M.A.R.T. axis 604 has reduced to a value of "7", indicating a 70% chance that the selected one of the hard disk drive 134 will remain functional in the computing system 100 for one year. The remaining axes all maintain a value of "10" indicating that no degradation was detected. A user can investigate the cause of the reduction on the S.M.A.R.T. axis 604 by clicking on the S.M.A.R.T. axis 604. A table 614 of the S.M.A.R.T. feature selection 404 with values indicating where the issues might be found. In this example a problem feature 616, such as a hardware ECC recovered feature, can be the cause of the issue, since 1A (hex) of the recovered errors have been detected, as shown in the table 614.

As a specific example, the event prediction mechanism 202 provides features that help users of the computing system 100 monitor the health of the hard disk drive 134, including but are not limited to a) daily AI-generated prediction of functionality of the hard disk drive 134 with the aim of helping customers or the computing system 100 identify vulnerable devices, b) values identified in the table 614 of the features selected can identify a variety of drive symptoms, such as the number of free-fall events detected, for helping users explore the potential root causes of device deterioration in the selected one of the hard disk drive 134 that has been predicted as failing.

The event prediction mechanism 202 can provide the symptom event prediction AI chart 220 which groups and transforms (via artificial intelligence models, machine learning models, or a combination thereof) drive symptom activity into the S.M.A.R.T. axis 604, the device self-test axis 606, the device temperature axis 608, the host-detected issues axis 610, and the device-detected issues axis 612, which are displayed on the symptom event prediction AI chart 220. Each axis can represent a summarization of a group of symptoms that were features selected to be most pertinent for the symptoms being detected. For example, the axis called S.M.A.R.T. was generated by taking values from S.M.A.R.T. attributes and submitting it to the AI models 208, such as artificial intelligence model, machine learning model, or a combination thereof, that can output one value summarizing the intensity of the S.M.A.R.T. feature selection 404. The symptoms that feed into the S.M.A.R.T. axis can partially overlap with the symptoms that feed into the other axes. The symptoms that feed into each axis are collected via a distinct mechanism. The exception to this is the device temperature axis 608, which is focused very specifically on device temperature information 212 of FIG. 2 as a symptom.

As examples, the symptom event prediction AI chart 220 can improve data availability, data reliability, or a combination there as well as benefit the user in a number of ways. For example, the symptom event prediction AI chart 220 provides the computing system 100, users, or a combination thereof with extra information about the degree to which each group of symptoms is active, an alternative estimate of risk for each drive based on each symptom group.

By way of an example, the user can utilize the symptom event prediction AI chart 220 by examining the information on the axis with the lowest score. For instance, if the axis with the lowest score is the S.M.A.R.T. axis 604 with a value of "2", implies that the drive has a 20% probability of remaining or surviving in the computing system 100 and an 80% probability of being removed by the user or automatically swapped out by the computing system 100.

Previously, systems, users, or a combination thereof had to process or scroll through a large list of symptoms and look to see which ones crossed thresholds (indicted by a symbol). The event prediction mechanism 202 can produce the symptom event prediction AI chart 220, which can filter the most active symptoms by clicking on a symptom axis with a low score. This will display the table 614 with the features selected for the axis that was selected by the user, system, or combination thereof.

Figure 7:
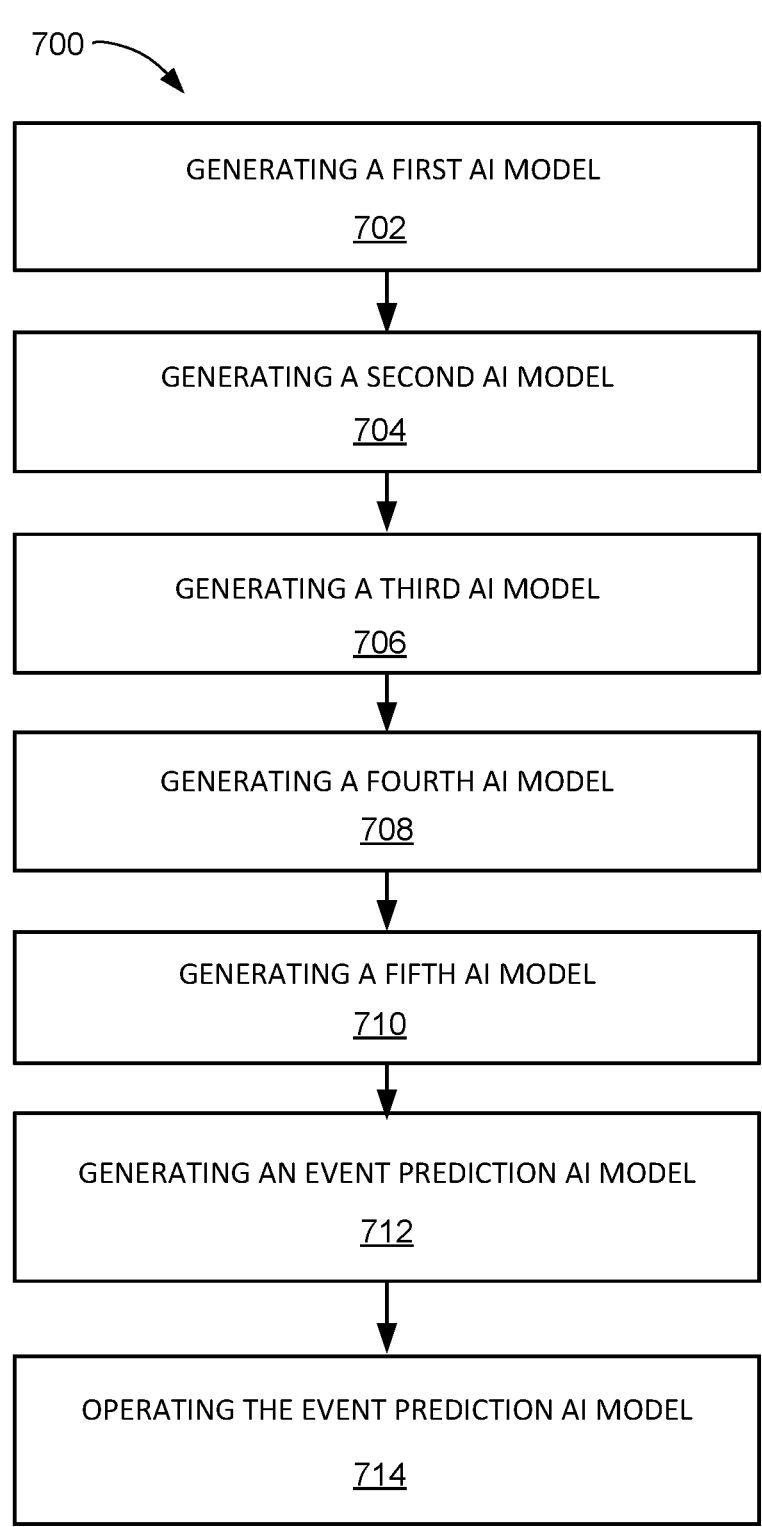
FIG. 7 is a flow chart of a method of operation of a computing system in an embodiment of the present invention.

Referring now to FIG. 7, therein is shown a flow chart of a method 700 of operation of the computing system 100 in a further embodiment of the present invention. The method 700 includes: generating a first artificial intelligence (AI) model for S.M.A.R.T. diagnostic information for a storage enclosure in a block 702; generating a second artificial intelligence (AI) model for device temperature information for the storage enclosure in a block 704; generating a third artificial intelligence (AI) model for device self-test information for the storage enclosure in a block 706; generating a fourth artificial intelligence (AI) model for device-detected issues for the storage enclosure in a block 708; generating a fifth artificial intelligence (AI) model for host-detected issues for the storage enclosure in a block 710; generating an event prediction artificial intelligence (AI) model from the aggregation of a feature selection from the first AI model, the second AI model, the third AI model, the fourth AI model, and the fifth AI model in a block 712; and operating the event prediction AI model for generating an event prediction for communicating an upcoming negative operational status for the storage enclosure in a block 714.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
a processor configured to:
    generate a first artificial intelligence (AI) model for Self-Monitoring Analysis and Reporting Technology (S.M.A.R.T.) diagnostic information for a storage enclosure;
    generate a second artificial intelligence (AI) model for device temperature information for the storage enclosure;
    generate a third artificial intelligence (AI) model for device self-test information for the storage enclosure;
    generate a fourth artificial intelligence (AI) model for device-detected issues for the storage enclosure;
    generate a fifth artificial intelligence (AI) model for host-detected issues for the storage enclosure;
    generate an event prediction artificial intelligence (AI) model from an aggregation of a feature selection from the first AI model, the second AI model, the third AI model, the fourth AI model, and the fifth AI model;
    operate the event prediction AI model to generate an event prediction for communicating an upcoming negative operational status for the storage enclosure;
    generate an event prediction AI chart including a S.M.A.R.T. axis, a device self-test axis, a device temperature axis, a host-detected issues axis, and a device-detected issues axis by the event prediction AI model; and
    apply a grading overlay to the event prediction AI chart indicating values of the event prediction by the event prediction AI model for attributes for displaying on a device.

2. The computing system as claimed in claim 1 wherein the processor further configured to generate the first AI model provides a S.M.A.R.T. feature selection, the second AI model provides a device temperature feature selection, the third AI model provides a device self-test feature selection, the fourth AI model provides a device-detected feature selection, and the fifth AI model provides a host-detected feature selection.

3. The computing system as claimed in claim 1 wherein the processor is further configured to generate the event prediction includes calculate a remaining usable life (RUL) including a functional indicator for displaying on the device.

4. The computing system as claimed in claim 1 wherein the processor is further configured to perform an AI update to refine an AI model.

5. The computing system as claimed in claim 1 wherein the processor is further configured to generate a S.M.A.R.T. prediction, a device temperature prediction, a device self-test prediction, a device-detected issues prediction, and a host-detected issues prediction different from the event prediction.

6. The computing system as claimed in claim 1 further comprising a communication interface configured to display a table of features selected for the S.M.A.R.T. axis, the device self-test axis, the device temperature axis, the host-detected issues axis, or the device-detected issues axis selected by a user includes displaying a problem feature on the device.

7. A method of operation of a computing system comprising:

generating a first artificial intelligence (AI) model for Self-Monitoring Analysis and Reporting Technology (S.M.A.R.T.) diagnostic information for a storage enclosure;

generating a second artificial intelligence (AI) model for device temperature information for the storage enclosure;

generating a third artificial intelligence (AI) model for device self-test information for the storage enclosure;

generating a fourth artificial intelligence (AI) model for device-detected issues for the storage enclosure;

generating a fifth artificial intelligence (AI) model for host-detected issues for the storage enclosure;

generating an event prediction artificial intelligence (AI) model from an aggregation of a feature selection from the first AI model, the second AI model, the third AI model, the fourth AI model, and the fifth AI model;

operating the event prediction AI model for generating an event prediction for communicating an upcoming negative operational status for the storage enclosure;

generating an event prediction AI chart including a S.M.A.R.T. axis, a device self-test axis, a device temperature axis, a host-detected issues axis, and a device-detected issues axis by the event prediction AI model; and applying a grading overlay to the event prediction AI chart indicating values of the event prediction by the event prediction AI model for attributes for displaying on a device.

8. The method as claimed in claim 7 wherein:

generating the first AI model provides a S.M.A.R.T. feature selection;

generating the second AI model provides a device temperature feature selection;

generating the third AI model provides a device self-test feature selection;

generating the fourth AI model provides a device-detected feature selection; and generating the fifth AI model provides a host-detected feature selection.

9. The method as claimed in claim 7 wherein generating the event prediction includes calculating a remaining usable life (RUL) including displaying a functional indicator on the device.

10. The method as claimed in claim 7 further comprising performing an AI update to refine an AI model.

11. The method as claimed in claim 7 further comprising generating a S.M.A.R.T. prediction, a device temperature prediction, a device self-test prediction, a device-detected issues prediction, and a host-detected issues prediction different from the event prediction.

12. The method as claimed in claim 7 further comprising displaying a table of features selected for the S.M.A.R.T. axis, the device self-test axis, the device temperature axis, the host-detected issues axis, or the device-detected issues axis selected by a user including displaying a problem feature on the device.

13. A non-transitory computer readable medium including instructions for a computing system, the instructions when executed by a processor cause the processor to perform functions comprising:

generating a first artificial intelligence (AI) model for Self-Monitoring Analysis and Reporting Technology (S.M.A.R.T.) diagnostic information for a storage enclosure;

generating a second artificial intelligence (AI) model for device temperature information for the storage enclosure;

generating a third artificial intelligence (AI) model for device self-test information for the storage enclosure;

generating a fourth artificial intelligence (AI) model for device-detected issues for the storage enclosure;

generating a fifth artificial intelligence (AI) model for host-detected issues for the storage enclosure;

generating an event prediction artificial intelligence (AI) model from an aggregation of a feature selection from the first AI model, the second AI model, the third AI model, the fourth AI model, and the fifth AI model;

operating the event prediction AI model for generating an event prediction for communicating an upcoming negative operational status for the storage enclosure;

generating an event prediction AI chart including a S.M.A.R.T. axis, a device self-test axis, a device temperature axis, a host-detected issues axis, and a device-detected issues axis by the event prediction AI model; and applying a grading overlay to the event prediction AI chart indicating values of the event prediction by the event prediction AI model for attributes for displaying on a device.

14. The non-transitory computer readable medium including the instructions as claimed in claim 13 wherein:

generating the first AI model provides a S.M.A.R.T. feature selection;

generating the second AI model provides a device temperature feature selection;

generating the third AI model provides a device self-test feature selection;

generating the fourth AI model provides a device-detected feature selection; and generating the fifth AI model provides a host-detected feature selection.

15. The non-transitory computer readable medium including the instructions as claimed in claim 13 wherein generating the event prediction includes calculating a remaining usable life (RUL) including displaying a functional indicator.

16. The non-transitory computer readable medium including the instructions as claimed in claim 13 further comprising generating a S.M.A.R.T. prediction, a device temperature prediction, a device self-test prediction, a device-detected issues prediction, and a host-detected issues prediction different from the event prediction.

17. The non-transitory computer readable medium including the instructions as claimed in claim 13 further comprising displaying a table of features selected for the S.M.A.R.T. axis, the device self-test axis, the device temperature axis, the host-detected issues axis, or the device-detected issues axis selected by a user including displaying a problem feature on the device.

\* \* \* \* \*